United States Patent
Kimura et al.

(10) Patent No.: US 9,306,426 B2
(45) Date of Patent: Apr. 5, 2016

(54) ROTOR OF ROTATING ELECTRICAL MACHINE, AND ROTATING ELECTRICAL MACHINE PROVIDED WITH SAME

(75) Inventors: Takahiro Kimura, Chiyoda-ku (JP); Kazunori Tanaka, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 221 days.

(21) Appl. No.: 14/000,165

(22) PCT Filed: May 31, 2011

(86) PCT No.: PCT/JP2011/003036
§ 371 (c)(1),
(2), (4) Date: Aug. 16, 2013

(87) PCT Pub. No.: WO2012/164611
PCT Pub. Date: Dec. 6, 2012

(65) Prior Publication Data
US 2013/0334918 A1    Dec. 19, 2013

(51) Int. Cl.
| H02K 3/51 | (2006.01) |
| H02K 5/22 | (2006.01) |
| H02K 21/04 | (2006.01) |
| H02K 3/52 | (2006.01) |
| H01F 5/04 | (2006.01) |

(52) U.S. Cl.
CPC .. *H02K 3/51* (2013.01); *H01F 5/04* (2013.01); *H02K 3/528* (2013.01)

(58) Field of Classification Search
CPC ............. H02K 3/528; H02K 3/51; H01F 5/04
USPC ............................ 310/71, 263, 49.13, 156.66
See application file for complete search history.

(56) References Cited

U.S. PATENT DOCUMENTS

| 5,174,013 | A | * | 12/1992 | Hiroshima et al. | ............. 29/605 |
| 5,539,265 | A | * | 7/1996 | Harris | .................... H02K 3/528 310/194 |
| 5,866,451 | A | * | 2/1999 | Yoo et al. | ....................... 438/241 |
| 5,892,313 | A | * | 4/1999 | Harris | .................. H02K 21/044 310/181 |
| 5,898,252 | A | * | 4/1999 | Tanaka et al. | ................. 310/214 |
| 6,114,786 | A | * | 9/2000 | Ishida et al. | .................... 310/71 |
| 6,172,434 | B1 | * | 1/2001 | Oohashi et al. | ................. 310/71 |

(Continued)

FOREIGN PATENT DOCUMENTS

| JP | 2007-151211 A | 6/2007 |
| JP | 2011-29299 A | 2/2011 |
| WO | 2004/038893 A1 | 5/2004 |

*Primary Examiner* — Terrance Kenerly
*Assistant Examiner* — Ahmed Elnakib
(74) *Attorney, Agent, or Firm* — Sughrue Mion, PLLC

(57) ABSTRACT

A rotor of a rotating electric machine is configured in such a way that a conductor wire 40 is wound around a bobbin 50 having first and second latching sections 60 and 61 provided in such a way as to extend radially outward from first and second flange sections 51 and 52, respectively, provided respective axis-direction ends of a winding section 59, and includes a magnetic-field coil 15 in which a winding-end section 41 of the conductor wire 40 is wound and latched around the second latching section 61 and in which a lead wire 42 drawn from the winding-end section 41 of the conductor wire 40 by way of the second latching section 61 is wound and latched around the first latching section 60; the radial-direction length of the second latching section 61 is shorter than the radial-direction length of the first latching section 60.

6 Claims, 4 Drawing Sheets

(56) References Cited

U.S. PATENT DOCUMENTS

| | | | |
|---|---|---|---|
| 6,311,383 B1* | 11/2001 | Umeda et al. | 29/596 |
| 6,784,577 B2* | 8/2004 | Kondo | 310/71 |
| 7,358,642 B2* | 4/2008 | Nishimura | 310/263 |
| 7,956,507 B2* | 6/2011 | Tokizawa | 310/194 |
| 2002/0047482 A1* | 4/2002 | Oohashi et al. | 310/263 |
| 2003/0034708 A1* | 2/2003 | Digby | H02K 3/528 310/194 |
| 2003/0137208 A1* | 7/2003 | York et al. | 310/194 |
| 2005/0218744 A1* | 10/2005 | Nakanishi | H01F 41/0687 310/194 |
| 2007/0114879 A1* | 5/2007 | Maeda et al. | 310/263 |
| 2007/0267935 A1* | 11/2007 | York et al. | 310/263 |
| 2011/0018375 A1 | 1/2011 | Kimura et al. | |

* cited by examiner

ROTOR OF ROTATING ELECTRICAL MACHINE, AND ROTATING ELECTRICAL MACHINE PROVIDED WITH SAME

CROSS REFERENCE TO RELATED APPLICATIONS

This application is a National Stage of International Application No. PCT/JP2011/003036 filed May 31, 2011, the contents of all of which are incorporated herein by reference in their entirety.

TECHNICAL FIELD

The present invention relates to a rotor of a rotating electric machine and a rotating electric machine provided with the rotor and particularly to the structure of a bobbin for latching the conductor wire of a magnetic-field coil provided in the rotor.

BACKGROUND ART

As a winding bobbin, for a magnetic-field coil, that is utilized in the rotor of a conventional rotating electric machine, there has been known a winding bobbin in which there are provided a winding section around which a conductor wire is wound and first and second flange sections provided on the respective sides of the winding section, in which a pair of first latching section and second latching section for latching the conductor wire are provided in the first flange section and the second flange section, respectively, and in which the winding-end section of the conductor wire that has been wound in an odd number of layers around the winding section is latched on the second and first latching sections (for example, refer to Patent Document 1).

In the case of this winding bobbin, the second latching section for latching the winding-end section of a conductor wire, wound in an odd number of layers around the winding section, is provided in the second flange section; therefore, even in the case where the number of winding layers of the conductor wire is odd, the lead wire drawn from the winding-start-side conductor wire and the lead wire drawn from the winding-end-side conductor wire can be led out in a single and the same direction, while with a simple configuration, a desired outer diameter of the coil is secured without loosening the conductor wire that has been tightly wound. Thus, because in the rotor utilizing this bobbin, the lead wire drawn from the winding-start-side conductor wire and the lead wire drawn from the winding-end-side conductor wire are led out in a single and the same direction, the rotor can readily be connected with a slip ring.

PRIOR ART REFERENCE

Patent Document

[Patent Document 1] Japanese Patent Application Laid-Open No. 2011-29299

DISCLOSURE OF THE INVENTION

Problem(s) to be Solved by the Invention

In this situation, in the case where a conductor wire is wound in an odd-number of layers around the winding bobbin disclosed in Patent Document 1, latching the conductor wire is performed in such a way that the winding-end section thereof is wound firstly on the second latching section and then on the first latching section; however, the conductor wire cannot be wound in such a way as to be tightly and completely along each of the latching sections, and hence the conductor wire is wound and latched with some play between the conductor wire and each of the latching sections.

The winding bobbin disclosed in Patent Document 1 is configured in such a way that after the conductor wire is wound around the winding section of the winding bobbin, the winding-end section of the conductor wire is wound and latched on the second latching section situated at one axis-direction end of the winding section and then is again drawn toward the other axis-direction end of the winding section. Accordingly, the number of conductor-wire winding turns is uniform at each position of the second latching section; for example, to data, the conductor wire has been wound in a single layer in order to raise the productivity. In contrast, in the case where after being latched on the second latching section, the conductor wire is wound around the first latching section, it is required that winding the conductor wire is started from one axis-direction end (closer to the second latching section than the other axis-direction end) of the first latching section and the conductor wire is finally connected with the slip ring situated closer to the other axis-direction end than the one axis-direction end of the first latching section; therefore, the wound conductor wire is drawn from the first latching section toward the other axis-direction end. Accordingly, the number of winding turns at the position in the first latching section where a winding-start section and a winding-end section overlap each other increases by one in comparison with the number of winding turns at other positions thereof. To date, when being fixed to the terminal section of the slip ring, the lead wire of the conductor wire wound and latched around the first latching section has been connected with the slip ring in such a way that predetermined tension is maintained; therefore, the conductor wire has been wound twice, for example, and latched around the first latching section; thus, at the foregoing position in the first latching section where the winding-start section and the winding-end section overlap each other, the conductor wire has been wound thrice around the first latching section. In addition, to date, there has been utilized a winding bobbin in which the first and second latching sections are formed in a single and the same shape and, as described above, it has been required to wind the conductor wire at least thrice; thus, it has been required that the radial-direction lengths of the first and second latching sections are three times as long as or longer than the diameter of the conductor wire.

Here, when a rotating electric machine having a rotor in which the winding bobbin disclosed in Patent Document 1 is utilized operates, a conductor wire wound and latched around the winding bobbin, which is fixed to the rotor, undergoes centrifugal force that lifts up the conductor wire in the radial direction. In this situation, the section, of the conductor wire, that is wound around the first latching section is wound with some play, as described above; however, because the lead wire of the conductor wire is secured on the slip ring in such a way that predetermined tension is maintained, the conductor wire can be prevented to some extent from being lift up by the centrifugal force. However, in contrast, the section, of the conductor wire, that is wound around the second latching section, does not have as much tension as that of the foregoing section that is connected with the slip ring. Moreover, because the conductor wire is wound only once around the second latching section, the conductive wire may readily be lift up by the centrifugal force.

Accordingly, the lift-up conductor wire may collide with a claw-shaped magnetic pole disposed radially outside the conductor wire and may be short-circuited. Moreover, also when the rotation speed of the rotating electric machine changes, the change in the rotation speed acts on the rotor and hence stresses may repeatedly be applied to the conductor wire; thus, there has been a problem that the durability of the conductor wire is lowered and hence the reliability of the rotating electric machine is deteriorated. In this situation, when the radial-direction lengths of the first and second latching sections are set to be shorter than those of a conventional wiring bobbin (e.g., to be set twice as long as the diameter of the conductor wire), the conductor wire can be suppressed from being lift up by centrifugal force; however, because in some cases, the conductor wire is wound thrice around the first latching section, the workability of winding the conductor wire may be deteriorated.

The present invention has been implemented in order to solve the foregoing problems; the objective thereof is to provide a rotor of a rotating electric machine in which the reliability and the durability thereof are raised by suppressing a conductor wire from being lift up by centrifugal force, without excessively deteriorating the workability of winding the conductor wire around the latching section of a bobbin.

Means for Solving the Problems

A rotor of a rotating electric machine according to the present invention is provided with a shaft; a pole core provided with a magnetic pole that rotates integrally with the shaft; a bobbin that is fixed to the pole core and includes a winding section, a first flange section and a second flange section provided at respective axis-direction ends of the winding section, a first latching section and a second latching section provided in such a way as to extend radially outward from the first flange section and the second flange section, respectively, and a first stopper section and a second stopper section provided in such a way as to further extend radially outward from the first latching section and the second latching section, respectively; a magnetic-field coil that is formed of a conductor wire wound around the bobbin and in which a winding-end section of the conductor wire is wound and latched around the second latching section, in which a lead wire drawn from the winding-end section by way of the second latching section is wound and latched around the first latching section, and in which a radial-direction travel of the conductor wire is limited by the first and second stopper sections; and a slip ring that is fixed to the shaft and is electrically connected with a lead wire of the conductor wire. The radial-direction length of the second latching section is shorter than the radial-direction length of the first latching section.

Advantage of the Invention

In the present invention, with regard to the first and second latching sections around which a conductor wire is wound and latched, the radial-direction length of the second latching section is set to be shorter than the radial-direction length of the first latching section; therefore, compared with a conventional rotor, the wiring section wound and latched around the second latching section is suppressed from being lift up by centrifugal force when the rotor rotates. As a result, the reliability and the durability of the rotor can be raised. Moreover, because in the present invention, only the radial-direction length of the second latching section is reduced, the workability, of winding the conductor wire, equivalent to that of a conventional structure can be secured at the first latching section; therefore, the winding workability is not excessively deteriorated.

BEST MODE FOR CARRYING OUT THE INVENTION

Embodiment 1

Figure 1:
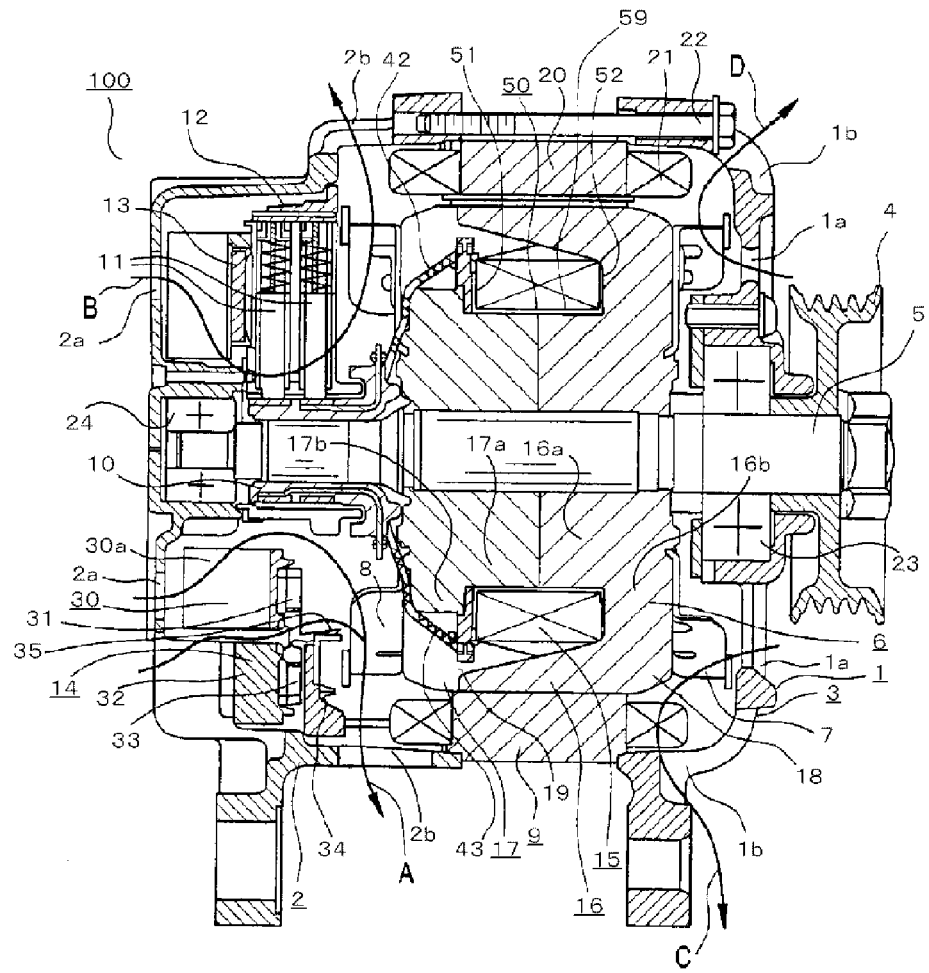
FIG. 1 is a side cross-sectional view illustrating an AC power generator according to Embodiment 1 of the present invention.
Figure 2:
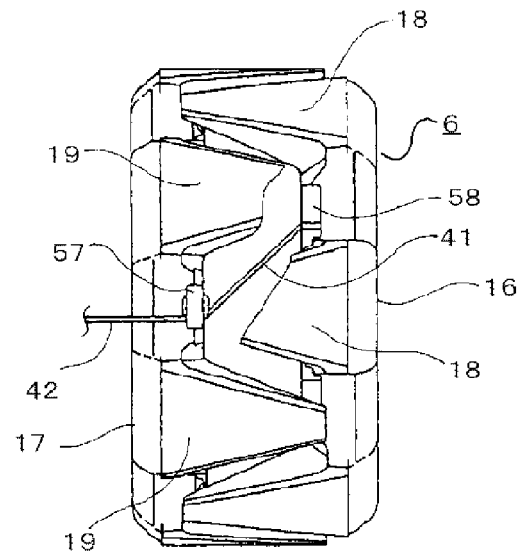
FIG. 2 is a side view illustrating a rotor of an AC power generator according to Embodiment 1 of the present invention.
Figure 3:
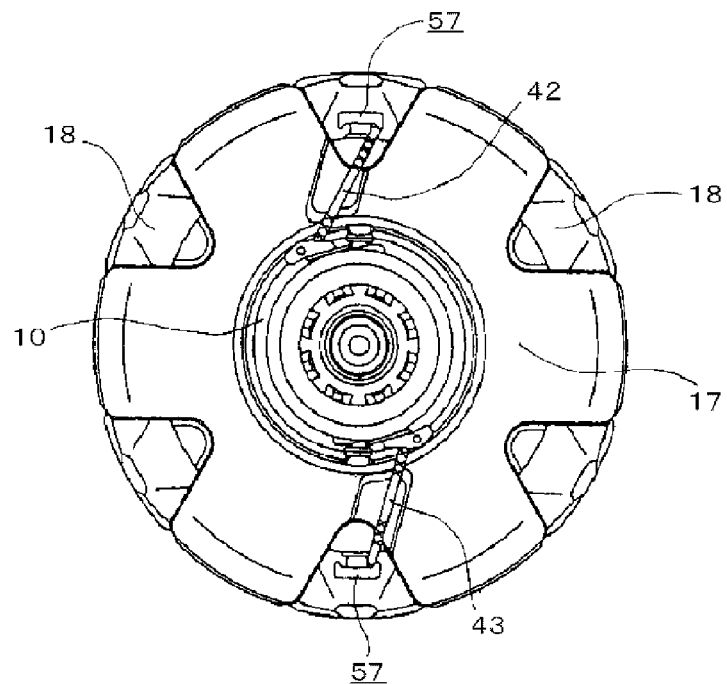
FIG. 3 is an elevation view illustrating a rotor of an AC power generator according to Embodiment 1 of the present invention.
Figure 4:
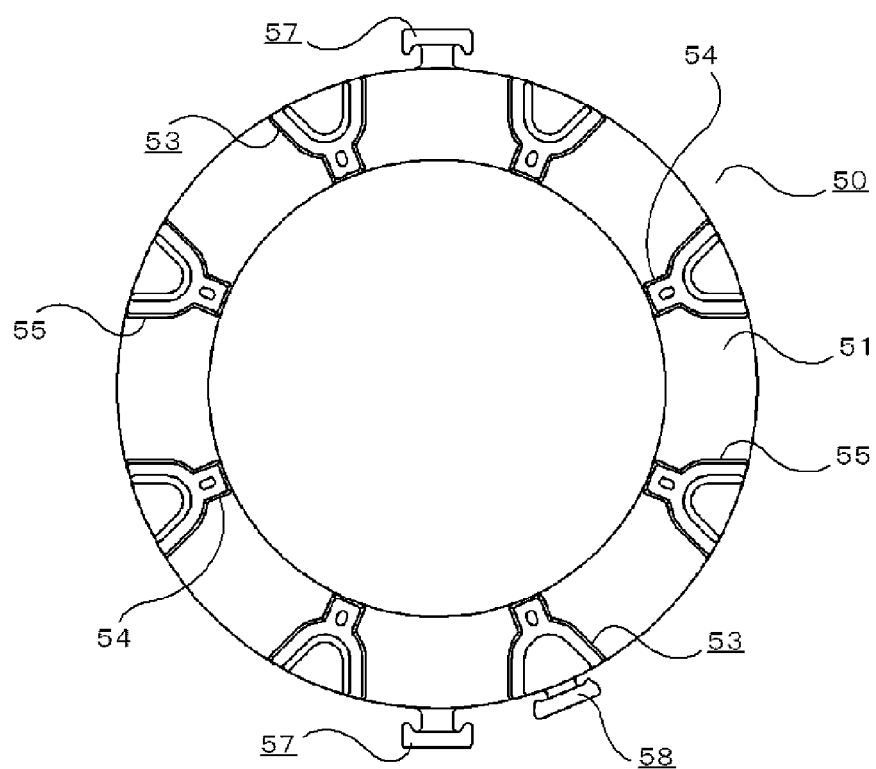
FIG. 4 is an elevation view illustrating a bobbin of an AC power generator according to Embodiment 1 of the present invention.
Figure 5:
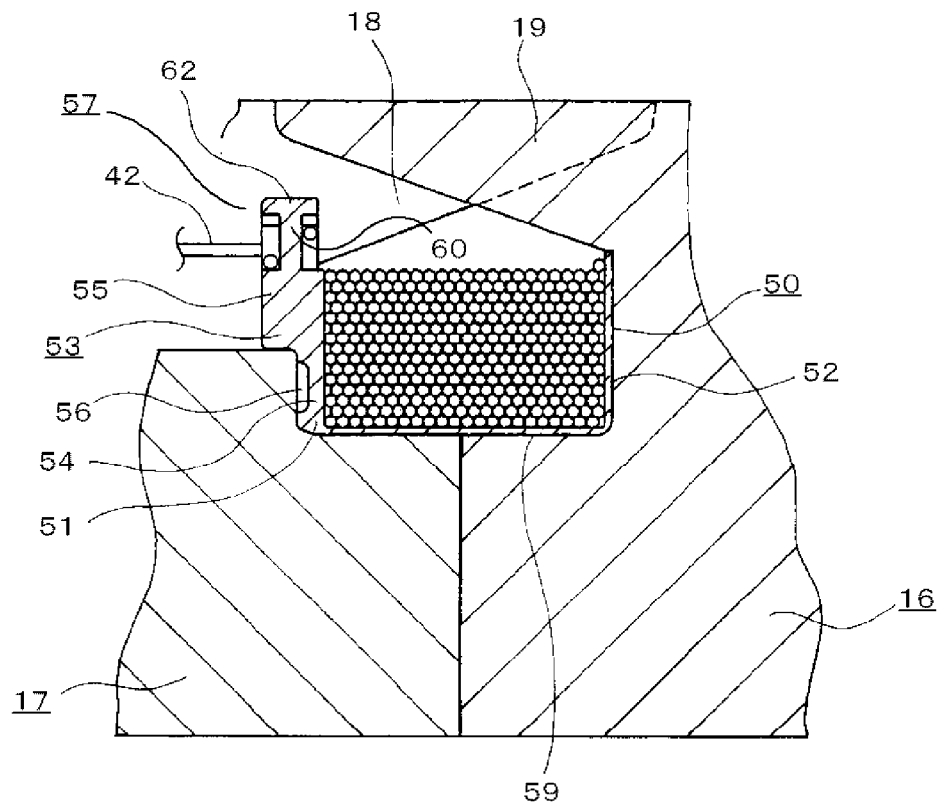
FIG. 5 is a side cross-sectional view illustrating the principal parts a rotor of an AC power generator according to Embodiment 1 of the present invention.
Figure 6:
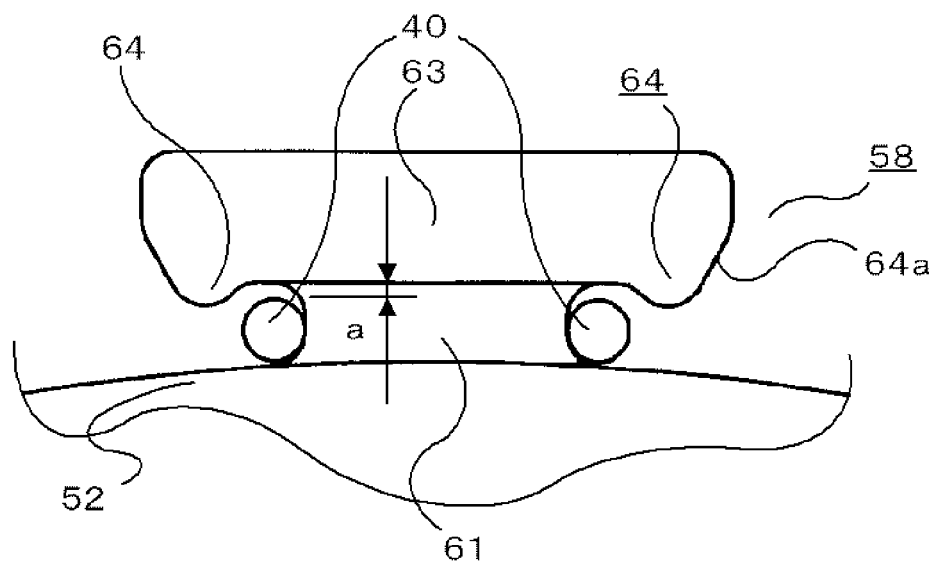
FIG. 6 is an enlarged elevation view illustrating the principal parts a bobbin of an AC power generator according to Embodiment 1 of the present invention.

FIG. 1 is a side cross-sectional view illustrating an AC power generator according to Embodiment 1 of the present invention; FIG. 2 is a side cross-sectional view illustrating a rotor of an AC power generator according to Embodiment 1 of the present invention; FIG. 3 is an elevation view illustrating a rotor of an AC power generator according to Embodiment 1 of the present invention. FIG. 4 is an elevation view illustrating a bobbin of an AC power generator according to Embodiment 1 of the present invention; FIG. 5 is a side cross-sectional view illustrating the principal parts of a rotor of an AC power generator according to Embodiment 1 of the present invention; FIG. 6 is an enlarged elevation view illustrating the principal parts a bobbin of an AC power generator according to Embodiment 1 of the present invention. Hereinafter, Embodiment 1 of the present invention will be explained with reference to the drawings. The explanation will be made with reference to the drawings, in each of which the same or similar constituent members and elements are designated by the same reference numerals.

An AC power generator 100 is provided with a case 3 formed of a front bracket 1 and a rear bracket 2 that are integrated with each other by use of a through-bolt 22; a stator 9 that is fixed to the front and rear brackets 1 and 2 and is formed of a stator core 20 and a stator coil 21 wound around the stator core 20; a shaft 5 whose respective ends are pivotably supported by a front bearing 23 mounted on the front bracket 1 and a rear bearing 24 mounted on the rear bracket 2 and, to one end of which, a pulley 4 is fixed; a rotor 6 that is provided inside the stator 9 and is fixed to the shaft 5; a slip ring 10 that is fixed to the other end of the shaft 5 and supplies a current to the rotor 6; a rectifier 14 that is electrically connected with the stator coil 21 and converts AC output into DC output; and a voltage adjuster 13 that is electrically connected with the rotor 6 and makes control so that an AC voltage generated across the stator coil 21 is within a predetermined range. A pair of brushes 11 contained in a brush holder 12 makes sliding contact with the surface of the slip ring 10; the voltage adjuster 13 is fixed to the brush holder 12.

A plurality of intake holes 1a are formed at the inner-diameter side of the front bracket 1, and a plurality of discharging holes 1b are formed at the outer-diameter side of the front bracket 1. A plurality of intake holes 2a are formed at the inner-diameter side of the front bracket 2, and a plurality of discharging holes 2b are formed at the outer-diameter side of the front bracket 2.

The rotor 6 is provided with a bobbin 50; a magnetic-field coil 15 in which a conductor wire 40, an enamel-copper wire, is wound in a plurality of layers around the bobbin 50 and a current is made to flow so that magnetic flux is generated; a pair of pole cores 16 and 17 that are provided over the magnetic-field coil 15 and are magnetized to N pole and S pole; a front-side fan 7 that is fixed to the end face, of the front-side pole core 16, that faces the pulley 4; and a rear-side fan 8 that is fixed to the end face, of the rear-side pole core 17, that faces opposite to the pulley 4. The front-side pole core 16 is configured with a front-side boss section 16a, a thick and ring-shaped front-side yoke section 16b that is provided to extend radially outward from one end of the boss section 16a, and a plurality of front-side claw-shaped magnetic poles 18 that are provided to extend from the outer circumferential section of the yoke section 16b to the other end in the axis-direction, and the rear-side pole core 17 is configured with a rear-side boss section 17a, a thick and ring-shaped rear-side yoke section 17b that is provided to extend radially outward from one end of the boss section 17a, and a plurality of rear-side claw-shaped magnetic poles 19 that are provided to extend from the outer circumferential section of the yoke section 17b to the other end in the axis-direction; the plurality of front-side claw-shaped magnetic poles 18 and the plurality of front-side claw-shaped magnetic poles 19 are engaged with each other; the front-side pole core 16 and the rear-side pole core 17 are produced of low-carbon steel and through a forging manufacturing method.

The stator 9 is provided with the stator core 20 through which a rotating magnetic field from the rotor 6 passes and with the stator coil 21 that is wound around the stator core 20 and generates AC output in accordance with a change in the magnetic flux from the magnetic-field coil 15 when the rotor 6 rotates. The stator coil 21 is formed of two three-phase AC windings that are connected in a three-phase Y-connection; there exists a phase difference between the two three-phase AC windings.

The rectifier 14 is provided with a first heat sink 30 that is made of aluminum and has a horseshoe shape, first unidirectional conductive devices 31 that are circumferentially arranged spaced apart from one another on the surface of the first heat sink 30 and have a rectangular-parallelepiped shape, a second heat sink 32 that is made of aluminum and disposed radially outside the first heat sink 30 and that has a horseshoe shape, second unidirectional conductive devices 33 that are circumferentially arranged spaced apart from one another on the surface of the second heat sink 32 and have a rectangular-parallelepiped shape, and a circuit board 34 that is provided over the second unidirectional conductive devices 33 and have a horseshoe shape. A plurality of radiating fins 30a are radially formed on the rear side of the aluminum-made first heat sink 30. The first unidirectional conductive device 31 is formed of a diode insert-molded with an insulating resin. Part of the rear side of the aluminum-made second heat sink 32 makes facial contact with the rear bracket 2. The second unidirectional conductive device 33 is formed of a diode insert-molded with an insulating resin. The circuit board 34 is formed of a plurality of insert-molded terminals 35. Through the terminals 35, the first unidirectional conductive device 31 and the second unidirectional conductive device 33 are connected with each other in such away as to configure abridge circuit. The stator coil 21 and the rectifier 14 are connected with each other through the terminals 35.

The bobbin 50 is formed of a nylon resin, which is an insulating material; a conductor wire is wound a predetermined number of times around a cylindrical winding section 59, so that the magnetic-field coil 15 is formed. The bobbin 50 is mounted in the front-side and rear-side pole cores 16 and 17 in such a way as to be disposed in a space enclosed by the front-side and rear-side boss sections 16a and 17a, the front-side and the rear-side yoke sections 16b and 17b, and the front-side and rear-side claw-shaped magnetic poles 18 and 19 and in such a way that the winding section 59 thereof is fit into the front-side and rear-side boss sections 16a and 17a. A first flange section 51 is formed at one end, of the winding section 59 of the bobbin 50, that is in the vicinity of the slip ring 10; a second flange section 52 is formed at the other end, of the winding section 59 of the bobbin 50, that is opposite to the slip ring 10 with respect to the bobbin 50. In each of the first flange section 51 and the second flange section 52, anti-rotation sections 53 protruding in the axis direction are circumferentially formed spaced evenly apart from one another. The anti-rotation section 53 is configured with a fitting section 54 that is fit into a root section of the front-side claw-shaped pole 18 or the rear-side claw-shaped pole 19 and an anti-rotation main body 55 that is thicker than the fitting section 54 and is situated between the base end sections of adjacent front-side claw-shaped poles 18 or adjacent rear-side claw-shaped poles 19. A recess section 56 is formed in each of the fitting sections 54; the recess section 56 is filled with an adhesive and solidified.

In the first flange section 51, there is provided an approximately T-shaped first latching body 57 that extends in the radial direction from each of a pair of opposite anti-rotation sections 53. In the second flange section 52, there is provided a second latching body 58 that extends in the radial direction from a single anti-rotation section 53 and has a T-shape that is approximately the same as but partially different from the shape of the first latching body 57.

Next, the detailed shapes of the first and second latching bodies 57 and 58 will be explained. FIG. 6 is an enlarged elevation view illustrating the principal parts of the second latching body 58 of the bobbin in FIG. 1. The first latching body 57 has a first latching section 60 around which the conductor wire 40 is wound and latched and a first stopper section 62 that extends in the radial direction from the first latching section 60 and has a longer circumferential-direction length than the first latching section 60; the second latching body 58 has a second latching section 61 around which the conductor wire 40 is wound and latched and a second stopper section 63 that extends in the radial direction from the second latching section 61 and has a longer circumferential-direction length than the second latching section 61. The first stopper section 62 prevents the wound conductor wire 40 from being displaced radially outward by centrifugal force and being unlatched from the first latching section 60, and the second stopper section 63 prevents the wound conductor wire 40 from being displaced radially outward by centrifugal force and being unlatched from the second latching section 61; respective protruding sections 64 are formed at both the circumferential-direction ends of the first stopper section 62, and respective protruding sections 64 are formed at both the circumferential-direction ends of the second stopper section 63. The protruding section 64 is formed in such a way that the narrowest radial-direction gap between the protruding section 64 and the first flange section 51 or the second flange section 52 has a distance the same as or longer than the diameter of the conductor wire 40, and a taper shape 64a is provided at the front end of the protruding section 64 so that the distance of the radial-direction gap becomes shorter as a given point in the gap proceeds to the first latching section 60 or the second latching section 61 in the circumferential direction.

The shape of the second latching body 58 differs from the shape of the first latching body 57 in that the radial-direction length of the second latching section 61 is shorter than that of the first latching section 60. Therefore, when the conductor wire 40 is wound and latched around the second latching section 61, the length (indicated by "a" in FIG. 6) within which the radial-direction travel of the conductor wire 40 is limited becomes shorter than the counterpart length of the first latching section 60.

Next, there will be explained the procedure in which in order to form the magnetic-field coil 15, the conductor wire 40 is wound around the bobbin 50. In Embodiment 1, in the case where the conductor wire 40 is wound in a plurality number of layers around the bobbin 50, after the winding-start section (unillustrated) of the conductor wire 40 is wound and latched around the first latching section 60, the conductor wire 40 is wound in the winding section 59 in the direction from the first flange section 51 to the second flange section 52; then, after the conductor wire 40 has been wound up to the second flange section 52, the conductor wire 40 is wound in the direction from the second flange section 52 to the first flange section 51. In the case where after this winding work has been repeated, the number of winding layers of the conductor wire 40 becomes an odd number, the winding of the conductor wire 40 is stopped at the second flange section 52; the winding-end section 41 of the conductor wire 40 passes through the gap between the protruding section 64 of the second stopper section 63 and the second flange section 52 and then is wound around the second latching section 61, so that the conductor wire 40 is temporarily latched. Then, as illustrated in FIG. 2, the temporarily latched conductor wire 40 is drawn out toward the first flange section 51 in such a way as to pass through the gap between the front-side claw-shaped magnetic pole 18 and the rear-side claw-shaped magnetic pole 19, which is adjacent to the front-side claw-shaped magnetic pole 18, and then is wound and latched around the first latching section 60; then, as is the case with a winding-start lead wire 43 that is situated in the winding-start section of the conductor wire 40, the section, of the conductor wire 40, from the latched position to the front end is lead out toward the slip ring 10, as a winding-end lead wire 42. The winding-start lead wire 43 and the winding-end lead wire 42 are electrically connected with the respective slip rings 10 while maintaining predetermined tension.

In the AC power generator 100 configured as described above, a battery (unillustrated) supplies an electric current to the magnetic-field coil 15 by way of the brush 11 and the slip ring 10, so that magnetic flux is generated and hence N pole and S pole is generated at the front-side and rear-side claw-shaped poles 18 and 19, respectively. The engine drives the pulley 4, and the rotor 6 rotates on the shaft 5; therefore, a rotating magnetic field is applied to the stator core 20, so that electromotive force is produced across the stator coil 21. The magnitude of this AC electromotive force is adjusted by the voltage adjuster 13. The AC current produced by this AC electromotive force is rectified into a DC current by the rectifier 14, and then the battery is charged therewith.

At the rear bracket 2, due to the rotation of the rear-side fan 8 fixed to the end face of the rotor 6, the outer air is taken in through the intake hole 2a while the AC power generator 100 operates; as indicated by the arrow "A" in FIG. 1, the outer air cools the rectifier 14 and the coil end of the stator coil 21 and then is discharged to the outside through the discharging hole 2b. As indicated by the arrow "B" in FIG. 1, the outer air cools the voltage adjuster 13 and then the stator coil 21; then, the outer air is discharged to the outside through the discharging hole 2b. At the front bracket 1, as indicated by the arrows "C" and "D" in FIG. 1, the outer air is taken in through the intake hole 1a, bent in the centrifugal direction by the front-side fan 7, cools the coil end of the stator coil 21, and then is discharged to the outside through the discharging hole 1b.

In the AC power generator 100 configured as described above, when due to the rotation of the rotor 6, centrifugal force is applied to the conductor wire 40, the conductor wire 40 wound and latched around the second latching section 61 is lift up radially outward up to the position of the second stopper section 63. In a conventional structure, because the first and second latching sections 60 and 61 have a single and the same shape, the respective radial-direction lengths thereof are equal to each other; however, because the respective numbers of winding turns at the first and second latching sections 60 and 61 are different from each other, the conductor wire 40 that is wound and latched around the second latching section 61 where the number of winding turns is less is lift up more. However, the structure according to Embodiment 1 can suppress the radially-outward travelling distance, at the second latching section 61, of the conductor wire 40; thus, the lift-up distance of the conductor wire 40 can be suppressed. AS a result, the conductor wire can be suppressed from being short-circuited or broken by centrifugal force; thus, the reliability and the durability of a rotor having the foregoing structure can be raised.

Moreover, because in Embodiment 1, only the radial-direction length of the second latching section 61 is reduced, the workability, of winding the conductor wire 40, equivalent to that of a conventional structure can be secured at the first latching section 60; therefore, the winding workability is not excessively deteriorated.

Furthermore, the front end of the protruding section 64 of the second stopper section 63 has the taper shape 64a so that the distance of the radial-direction gap between the protruding section 64 and the second flange section 52 becomes shorter as a given point in the gap proceeds to the second latching section 61 in the circumferential direction. As a result, in the case where the conductor wire 40 is wound around the second latching section 61, the conductor wire 40 can securely be introduced, along the taper shape 64a, into the gap between the protruding section 64 and the second flange section 52; therefore, the workability of winding the conductor wire 40 is raised and hence a rotor having an improved productivity can be provided.

Here, there will be examined the length "a" within which the radial-direction travel of the conductor wire 40 is limited when the conductor wire 40 is wound and latched around the second latching section 61. To date, the conductor wire 40 has been wound in two turns and latched around the first latching section 60; the conductor wire 40 needs to be wound at least in one turn. Accordingly, at the position in the first latching section 60 where a winding-start section and a winding-end section overlap each other, the conductor wire 40 is wound at least in two turns. In this situation, the conductor wire 40 needs to be wound at least in one turn also at the second latching section 61; however, because in this case, the winding-start and winding-end directions are the same, the conductor wire 40 is wound uniformly in one turn at each position. For these reasons, when the conductor wire 40 is wound and latched around the second latching section 61, the length "a" within which the radial-direction travel of the conductor wire 40 is limited is set to be the same as or shorter than the diameter of the conductor wire 40, so that even when the conductor wire 40 is lift up by centrifugal force, the radial-direction length does not become longer than the conductor wire 40 wound around the first latching section 60; thus, the conductor wire 40 can further be suppressed from being lift up. Therefore, the reliability and the durability of a rotor having this structure can further be raised.

Embodiment 2

Figure 7:
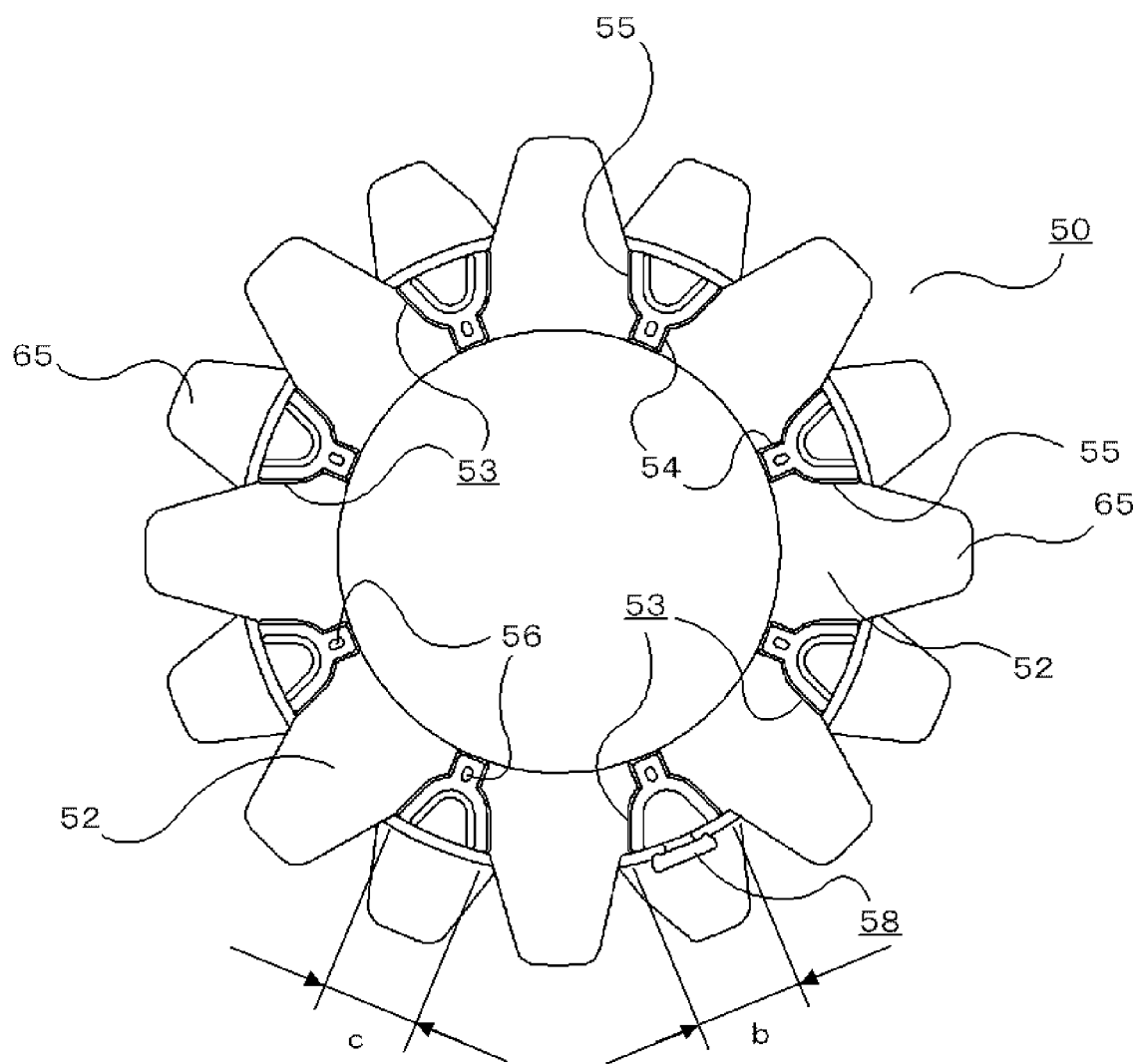
FIG. 7 is an elevation view illustrating a bobbin of an AC power generator according to Embodiment 2 of the present invention.

Next, Embodiment 2 of the present invention will be explained with reference to FIG. 7. FIG. 7 is an elevation view illustrating a bobbin of an AC power generator according to Embodiment 2 of the present invention. The explanation will be made with the same or equivalent constituent elements designated by reference characters the same as those in Embodiment 1. In the structure according to Embodiment 2, the bobbin 50 is formed integrally with a cover section 65, for securing electric insulation between the magnetic-field coil 15 and the front-side claw-shaped pole 18 or the rear-side claw-shaped pole 19, that extends from the respective external circumferential portions of the first and second flange sections 51 and 52 in such a way as to cover the magnetic-field coil 15 wound around the winding section 59.

The cover section 65 is disposed in such a way as to extend radially outward in a space between the respective circumferential-direction ends of the anti-rotation sections 53 formed to be circumferentially adjacent to the first and second flange sections 51 and 52. Accordingly, as illustrated in FIG. 7, the bobbin 50 has a structure in which when it is viewed in the axis direction from the second flange section 52, the anti-rotation sections 53 and the cover sections 65 are alternately arranged in the circumferential direction. In Embodiment 2, the bobbin 50 is configured in such a way that the circumferential-direction distance (indicated by "b" in FIG. 7) between the respective cover sections 65 formed in such a way as to flank the anti-rotation section 53 from which the second latching section 61 extends is longer than the circumferential-direction distance (indicated by "c" in FIG. 7) between the respective cover sections 65 formed in such a way as to flank the anti-rotation section 53 from which the second latching sections 61 does not extend.

In this situation, winding and latching the conductor wire 40 around the second latching section 61 of the bobbin 50 is performed through a procedure in which the conductor wire 40 is made to pass through the gap between the protruding section 64 and the second flange section 52 and then is wound around the second latching section 61; however, in this situation, interference between the cover section 65 and the conductor wire 40 or a conductor-wire wiring jig may break the cover section 65 and hence the electric insulation between the magnetic-field coil 15 and the front-side claw-shaped pole 18 or the rear-side claw-shaped pole 19 may be deteriorated, or when the conductor wire 40 is wound with precision so that the cover section 65 is not broken, the workability of winding may be deteriorated.

In Embodiment 2, the circumferential-direction distance between the respective cover sections 65 formed in such a way as to flank the anti-rotation section 53 from which the second latching section 61 extends is secured to be longer than the circumferential-direction distance between the respective cover sections 65 formed in such a way as to flank the anti-rotation section 53 from which the second latching sections 61 does not extend; therefore, the interference between the cover section 65 and the conductor wire 40 can be suppressed when the conductor 40 is wound and latched; thus, the winding workability is also suppressed from being deteriorated. Therefore, there can be provided a rotor, of a rotating electric machine, that has a higher insulating performance and an improved workability of winding a conductor wire.

Moreover, in Embodiment 2, the circumferential-direction distance "b" of the respective cover sections 65 formed in such a way as to flank the anti-rotation section 53 from which the second latching section 61 has been specified. Similarly, in the case where the circumferential-direction distance between the respective cover sections 65 formed in such away as to flank the anti-rotation section 53 from which the first latching section 60 extends is also secured to be longer than the circumferential-direction distance between the respective cover sections 65 formed in such a way as to flank the anti-rotation section 53 from which the first latching section 60 does not extend, there can be provided a rotor, of a rotating electric machine, that has a further higher insulating performance and a further improved workability of winding a conductor wire.

In each of the Embodiments 1 and 2, the second latching section 61 is provided at only one position in the second flange section 52; however, it may also be allowed that two or more second latching sections 61 are provided at a plurality of positions and the winding-end section 41 is latched on the second latching section 61.

In each of Embodiments 1 and 2, an AC power generator has been explained; however, the present invention is not limited thereto but demonstrates the same effect even when applied to a rotating electric machine such as a motor or a power-generation motor, especially, to a vehicle electric rotating machine. For example, a vehicle AC generator, which is a vehicle electric rotating machine, is coupled with an engine through the intermediary of a pulley, and the speed increasing ratio is set to be large so that sufficient output can be obtained even when the engine rotates at a low speed. Accordingly, the rotor and the magnetic-field coil of the vehicle AC generator rotate several times as fast as the engine. As a result, because the vehicle AC generator is a product that undergoes large centrifugal force in particular and whose durability and reliability are severely required depending on its application, the use of the present invention can raise the reliability and the durability of the vehicle AC generator.

DESCRIPTION OF REFERENCE NUMERALS

5: shaft
10: slip ring
15: magnetic-field coil
16: front-side pole core
17: rear-side pole core
18: front-side claw-shaped magnetic pole
19: rear-side claw-shaped magnetic pole
40: conductor wire
41: winding-end section
42: winding-end lead wire
50: bobbin
51: first flange section
52: second flange section
59: winding section
60: first latching section
61: second latching section
62: first stopper section 63: second stopper section
64: protruding section
64a: taper shape
65: cover section
100: AC power generator

The invention claimed is:

1. A rotor of a rotating electric machine comprising:
a shaft;
a pole core provided with a magnetic pole that rotates integrally with the shaft;
a bobbin that is fixed to the pole core and includes
a winding section, a first flange section and a second flange section provided at opposite axis-direction ends of the winding section, a first latching section and a second latching section provided in such a way as to extend radially outward from the first flange section and the second flange section, respectively, and a first stopper section and a second stopper section provided in such a way as to further extend radially outward from the first latching section and the second latching section, respectively;
a magnetic-field coil that is formed of a conductor wire wound around the bobbin and in which a winding-end section of the conductor wire is wound and latched around the second latching section, in which a lead wire drawn from the winding-end section by way of the second latching section is wound and latched around the first latching section, and in which a radial-direction travel of the conductor wire is limited by the first and second stopper sections; and
a slip ring that is fixed to the shaft and is electrically connected with a lead wire of the conductor wire, wherein the radial-direction length of the second latching section is shorter than the radial-direction length of the first latching section.

2. The rotor of a rotating electric machine according to claim 1, wherein the second stopper section has a protruding section provided in such a way as to protrude radially inward from a circumferential-direction end thereof, and a taper shape is provided at the front end of the protruding section so that a radial-direction gap between the second flange section and the second stopper section becomes smaller as a given point in said gap proceeds to the second latching section in the circumferential direction.

3. The rotor of a rotating electric machine according to claim 1, wherein the length within which a radial-direction travel of the conductor wire is limited by the second stopper section is the same as or shorter than the diameter of the conductor wire.

4. The rotor of a rotating electric machine according to claim 1, wherein the bobbin has a plurality of cover sections that protrude from the second flange sections and are arranged in such a way as to extend in the circumferential direction so that an insulation between the magnetic-field coil and the pole core is secured, and a circumferential-direction gap between the cover sections that are adjacent to each other through the intermediary of the second latching section is larger than the circumferential-direction gap between the cover sections that are adjacent to each other without intermediary of the second latching section.

5. A rotating electric machine including the rotor of a rotating electric machine according to claim 1.

6. The electric rotating machine according to claim 5, wherein the rotating electric machine is a vehicle AC generator.

* * * * *